(12) United States Patent
Levesque et al.

(10) Patent No.: US 6,550,506 B1
(45) Date of Patent: Apr. 22, 2003

(54) DELIMBER/SLASHER

(76) Inventors: Gilles Levesque, P.O. Box 263, Pennfield New Brunswick (CA), E5H 2M1; Pierre Levesque, 56 Turnpike Rd., Pennfield New Brunswick (CA), E5H 2C1

( * ) Notice: Subject to any disclaimer, the term of this patent is extended or adjusted under 35 U.S.C. 154(b) by 0 days.

(21) Appl. No.: 09/941,189

(22) Filed: Aug. 29, 2001

(51) Int. Cl.⁷ .............................................. A01G 23/08
(52) U.S. Cl. ..................... 144/338; 83/467.1; 83/468.6; 144/4.1; 144/24.13; 144/335; 144/343
(58) Field of Search ............................... 83/467.1, 468.1, 83/468.2, 468.5, 468.6, 928; 144/4.1, 24.13, 34.1, 335, 336, 338, 343; 269/315, 320

(56) References Cited

U.S. PATENT DOCUMENTS

| | | | | |
|---|---|---|---|---|
| 3,763,905 A | * | 10/1973 | Hamilton | 144/24.13 |
| 3,856,060 A | * | 12/1974 | Savage et al. | 144/336 |
| 3,972,357 A | | 8/1976 | Neal | |
| 4,582,104 A | | 4/1986 | Sigouin | |
| 4,773,455 A | * | 9/1988 | Lessaro | 144/24.13 |
| 4,838,328 A | * | 6/1989 | Herolf | 144/24.13 |
| 5,148,843 A | * | 9/1992 | Cote | 144/24.13 |

* cited by examiner

*Primary Examiner*—W. Donald Bray (57) ABSTRACT

A boom assembly for a delimber having an operator boom with first and second ends and a connector boom having first and second ends. Pivot means pivotably connect the second end of the operator boom to the first end of the connector boom, the connector boom aligned with the operator boom. A delimber boom, having a delimbing head at one end, is mounted near the one end to the connector boom at its second end. The delimber boom extends rearwardly from the connector boom and at a slight angle, when the boom assembly is viewed from above, to the connector boom. The delimbing head is mounted on the bottom of the delimber boom and the boom assembly includes at least two butt plates, each movably mounted on the bottom of the delimber boom. The butt plates are spaced apart longitudinally and spaced from the delimbing head toward the other end of the delimber boom. Operating means, associated with each butt plate on the delimber boom, selectively move the butt plate between an operative position where it is generally transverse to the delimber boom and aligned with the delimbing head to receive the butt end of a tree being delimbed by the delimbing head, and an inoperative position where it is out of the way of the butt end of a tree being delimbed.

32 Claims, 7 Drawing Sheets

DELIMBER/SLASHER

BACKGROUND OF THE INVENTION

1. Field of the Invention

This invention is directed toward a delimber/slasher. The invention is also directed toward a boom assembly for use in a delimber/slasher and a delimbing boom for use with a boom assembly in a delimber/slasher. The invention is also directed toward a method of using the delimber/slasher.

2. Description of the Related Art Including Information Disclosed Under CFR §§1.97–1.99

Delimbers for delimbing felled trees are known. The known delimbers usually have either a fixed length sliding boom, sliding through a tubular support mounted on a vehicle, or a telescopic boom mounted on a support on a vehicle. Either type of boom has first gripping means at its free or head end for gripping the end of a felled tree. The support, supporting the boom, has second gripping means for holding the tree at its butt end. In use, the boom grips the butt end of a felled tree with the first gripping means, positions the butt end in the second gripping means, and operates the boom to move the first gripping means relative to the second gripping means to delimb the tree. Some of these delimbers have a cut-off saw at the head end of the boom for topping off the delimbed tree and some have a butt plate at the support against which the tree is positioned. The delimbed trees are all tree length however and further processing, using a different machine, is then required to cut the delimbed trees into the log lengths required by the mill.

It is also known to provide delimber/slashers having a delimbing head at the end of a boom, the head carrying tree gripping means; tree feeding means and a cut-off saw. In use, the butt end of a tree is gripped, by the gripping means and placed between the feed rollers. The feed rollers then move the tree rearwardly while the gripping arms delimb the tree. Some form of measuring means measures the length of tree delimbed and when a desired delimbed length is reached the cut-off saw is operated to cut off a log length. The measuring means employed however are not very accurate and the machine is operated to cut off log lengths which are well over the required length to ensure that minimum log length requirements are met. This however results in waste.

The known delimbers/slashers have other disadvantages as well. The fixed-length booms are quite long and this makes it difficult for the operator to clearly see the trees to pick them up. Also, the fixed-length booms, being quite long, can cause considerable damage to new and second growth trees when swinging around while in use. Further, fixed-length booms make it difficult, if not impossible, to handle felled trees located just in front of the delimber without having to move the delimber. The more the delimber has to be moved however, the less efficient the operation of the machine. Delimbers with telescoping booms have similar problems but not as pronounced. The manner of mounting of the boom on the vehicle and length of the boom also makes it difficult to leave delimbed trees parallel, or nearly parallel to the logging trail for pickup. Using the known delimbers, the delimbed trees are piled to the side of the trail, partway, or even completely, off the trail further damaging the environment. It is desirable to try to leave the trees as parallel to the logging trail as possible since subsequent collecting is easier and more environmental friendly.

Delimbers with a delimbing head at the end of a boom also have difficulty in delimbing, slashing and stacking the logs on the trail since the tree is usually delimbed in a direction transverse to the boom, and to the trail, to enable the operator to see the machine working. The cut-off logs thus extend transverse to the trail, and, to leave the trail open, may even extend partway off the trail again damaging the environment.

Environmental concerns are resulting in the passing of regulations requiring a high percentage of the area being logged to remain undamaged. It is difficult to do this with known delimbers and delimber/slashers. Known delimbers and delimber/slashers also are not constructed to leave the delimbed trees/cut-off logs in a position on the side of the trail, generally parallel to the trail, for easy pickup without extensively damaging the environment while maneuvering to try to place the trees/logs in the desired pick-up position. Known delimber/slashers also do not readily and easily allow the delimbed tree to be cut to various lengths and, more particularly, to be cut to various, accurate, lengths.

The use of known delimbers and delimber slashers also result in quite extensive damage to the environment. Using delimbers with a delimbing head at the end of a boom, requires the feller buncher, which passes on the logging trail first, to fell and bunch the trees to the side of the trail and extending in a direction transverse to the trail. This usually means that the trees extend far off the trail and damage the uncut forest area. Using delimbers with fixed length or telescopic booms has the long booms causing damage as they are swung about handling the trees, delimbing them, and stacking them on or beside the trail for slashing. The slashing operation requires another machine on the logging trail for slashing/forwarding the logs which leads to further environmental damage on the trail.

SUMMARY OF THE INVENTION

It is the purpose of the present invention to provide a delimber/slasher that allows the operator to more easily see the delimbing head thus making operation of the machine, particularly when picking up trees, easier. It is another purpose of the present invention to provide a delimber/slasher that makes it easier to see and reach felled trees very close to the machine thus lessening the movement required of the delimber/slasher. It is another purpose of the present invention to provide a delimber/slasher that can process trees to be delimbed and cut in a manner whereby the delimbed trees are processed to log length within the logging trail and are stacked parallel, or generally parallel, to the logging trail, and on the side of the logging trail, thereby making collecting of the logs much quicker and easier. It is a further purpose of the present invention to provide a delimber/slasher that can easily cut delimbed trees to any one of several required log lengths and to cut the trees to more accurate lengths than is now possible. It is a further purpose of the present invention to provide a delimber/slasher that can be easily adjusted to vary the log lengths that are cut off the tree. It is yet another purpose to provide a delimber/slasher that can be used in tree harvesting operations to provide an environmentally friendly harvesting operation.

In accordance with the present invention, a boom assembly for a delimber/slasher is provided having a supporting boom structure adapted to be connected to a vehicle at one end and having a delimber boom connected to the other end of the supporting boom structure. The delimber boom carries a delimbing head at its front end, the delimbing head having gripping and delimbing arms; feed rollers; and a cut-off saw; as is known. The delimber boom is angularly offset with respect to the supporting boom when the boom assembly is viewed from the top. Offsetting the delimber boom offsets the tree being delimbed from the supporting boom, and from the vehicle as well, allowing the delimber operator a clear look at the delimbing head during use and making it easier to pick up trees. With the tree offset from the vehicle, delimbing and cutoff can take place closer to the vehicle allowing the operator a better look at, and better control over, the operations. The angularly offset delimber boom also allows the trees being delimbed and cut to be more easily delimbed within the logging trail and, when cut, to be piled on the side of trail, more closely parallel to the trail, thus making forwarding of the trees easier and minimizing damage to the adjacent uncut portions of the logging area. The angularly offset delimbing boom, and the supporting boom which is a knuckle boom structure, also allows the delimbing head to be moved close to the delimbing vehicle allowing handling of felled trees close to the vehicle and making the machine more efficient in operation since it does not have to move as much in processing the felled trees. The angularly offset delimbing boom and knuckle boom arrangement also sets the boom assembly close to the ground making the delimber/slasher very stable in operation and minimizing log damage when dropped to the ground from the boom.

Further, in accordance with the present invention, the delimber/slasher, in one embodiment, uses a delimbing boom with a butt plate at one end. The butt plate determines the length of log to be cut-off, the delimbed tree fed rearwardly until its butt end hits the butt plate. Feeding is stopped and the cut-off saw is actuated to cut a log off. In a preferred embodiment, the delimber boom has a plurality of butt plates allowing different, accurate, lengths of log to be cut from the delimbed tree. A plurality of longitudinally spaced-apart butt plates are preferably provided on the delimbing boom with moving means for moving any selected one of the butt plates into operative position, the butt plates determining the lengths to be cut from the delimbed tree. The boom is made at least as long as the longest log to be cut, with the butt plate farthest from the cut-off saw determining the longest log that could be cut. Further, each butt plate is preferably mounted for longitudinal adjustment relative to the cutoff saw on the delimbing boom to be able to vary the lengths of tree that are to be cut off using each butt plate. If desired, the cutoff saw on the delimbing boom can also be mounted for limited longitudinal movement relative to the butt plates between maximum and minimum positions. The movable arrangements for the butt plates and the cut-off saw allows tree lengths to be cut to more accurate lengths and also allows different lengths to be accurately cut depending on the end use of the logs cut from the tree. The delimbing boom, with a plurality of butt plates; and/or with the position of the butt plates adjustable; and/or with the position of the cut-off saw adjustable can also be used on delimber/slashers which do not employ an angularly offset delimber boom. Such a machine would not have all the advantages of a machine employing an angularly off-set delimber boom, but would still provide advantages in cutting off logs more accurately and more diversity.

The invention is particularly directed toward a boom assembly for a delimber/slasher. The boom assembly has an operator boom; a connector boom pivotably connected at one end to one end of the operator boom; and a hydraulic operator pivotably connected at its ends between the operator boom and the connector boom in a manner to move the other end of the connector boom toward or away from the other end of the operator boom when operated. A delimber boom having a delimbing head at one end, is fixedly mounted, behind the delimbing head, to the connector boom at its other end, the delimber boom mounted to extend at a slight angle, when the boom assembly is viewed from above, to the connector boom.

The invention is also directed toward a delimber boom used on a delimber/slasher. The delimber boom has a delimbing head at one end and at least two butt plates toward the other end of the boom, the butt plates spaced apart in the longitudinal direction of the boom. Mounting means mount each butt plate on the boom. Moving means are provided for each butt plate for selectively moving the butt plate between an operative position transverse to the boom and extending down from the boom to be aligned with a delimbed tree emerging rearwardly from the delimbing head to receive the butt end of the tree, and an inoperative position where it is out of the path of the delimbed tree emerging rearwardly from the delimbing head.

The invention is further directed toward a delimber boom to be used on a delimber/slasher, the delimber boom having a delimbing head at one end and a butt plate at the opposite end. The delimbing head carries delimbing means, feed means and a cut-off saw. The cut-off saw has mounting means for adjustable mounting it on the delimber head to vary its distance from the butt plate.

The invention is also particularly directed toward a tree harvesting method using the delimber/slasher of the present invention. In the method, a feller buncher moves in one direction from a logging road, along a logging trail, back to the logging road, felling and bunching trees on the trail with their butt ends facing the direction of travel of the feller buncher. A delimber/slasher, having a delimber boom angularly offset from a support boom then moves in the opposite direction on the logging trail to pick-up, delimb and slash the felled trees on the trail with the delimber boom while stacking the logs on the sides of the trail substantially parallel to the trail.

DESCRIPTION OF THE PREFERRED EMBODIMENTS

Figure 1:
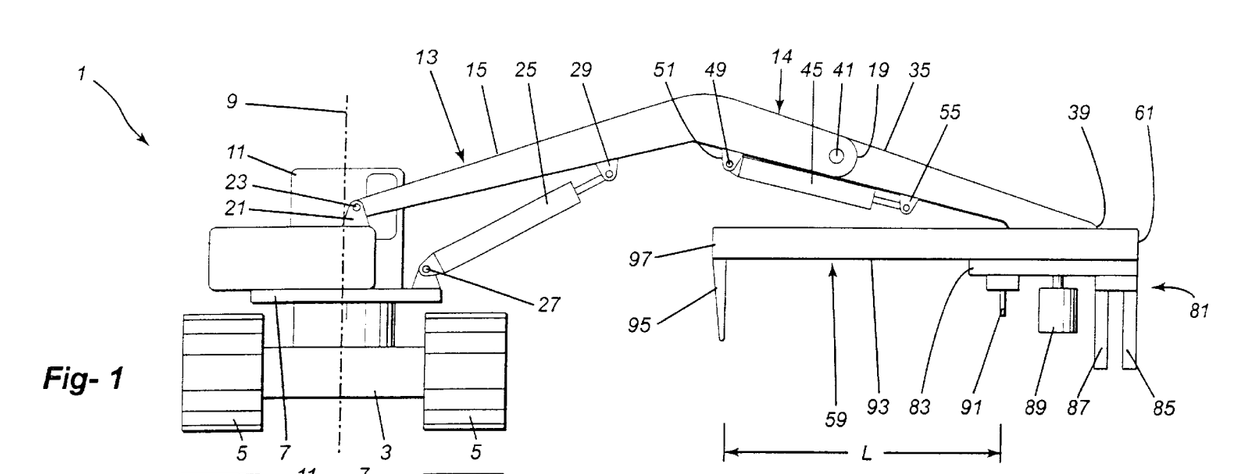
FIG. 1 is a side view of the delimber with the boom extended.
Figure 2:
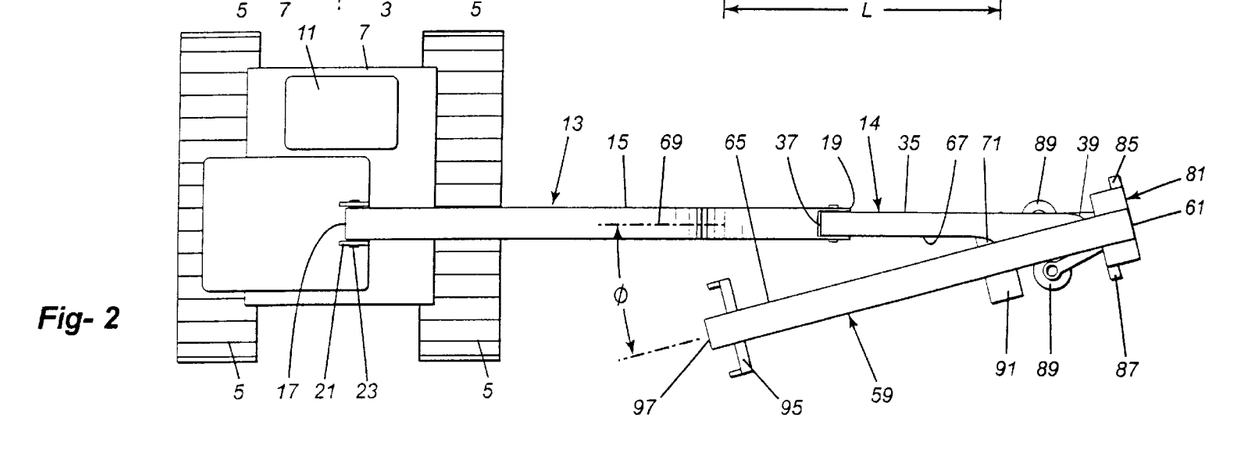
FIG. 2 is a top view of the delimber shown in FIG. 1.
Figure 3:
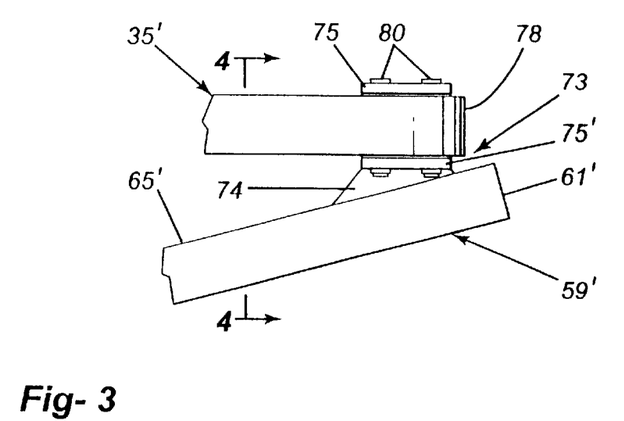
FIG. 3 is a detail plan view showing connection means connecting the boom connector to the delimber boom.
Figure 4:
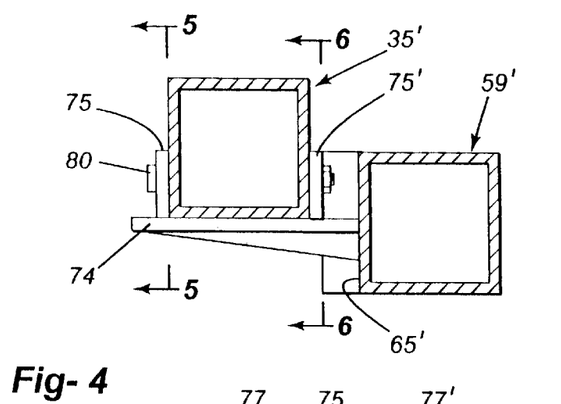
FIG. 4 is a view taken along line 4—4 in FIG. 3.
Figure 5:
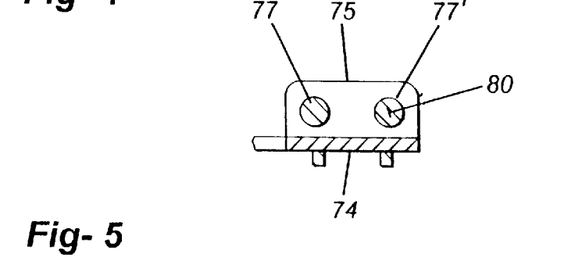
FIG. 5 is a cross-section view, along line 5—5 in FIG. 4, of one part of the connecting means at the end of the delimber boom.
Figure 6:
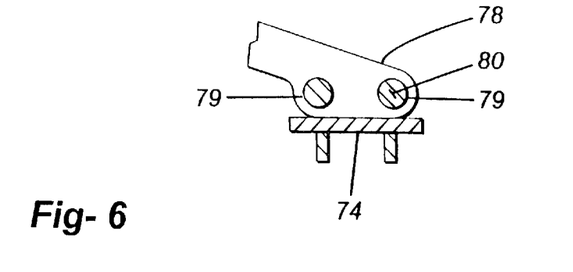
FIG. 6 is a cross-section view, along line 6—6 in FIG. 4, of the front end of the boom connector.

The delimber/slasher 1 of the present invention, as shown in FIGS. 1 and 2, has a vehicle base 3 with tracks 5. A rotatable support 7 is mounted on the vehicle base 3, the support 7 rotatable about a vertical axis 9. A cab 11 for the delimber/slasher operator is mounted on the support 7 as are a boom assembly 13; the motor means (not shown) for the vehicle base 3; and the hydraulic system (not shown) necessary to operate the boom assembly 13.

The boom assembly 13 includes a support boom structure 14. The support boom 14 has an operating boom 15 with first and second ends 17, 19. The first end 17 of the operating boom 15 is mounted on the support 7, via a bracket 21, by a horizontal pivot 23. A hydraulic operator 25 is pivotably mounted at one end by a horizontal pivot 27 to the support 7 in front of, and below, the pivot 23 of the operating boom 15, the pivot 27 being parallel to the pivot 23. The other end of the operator 25 is pivotably mounted by a horizontal pivot 29, parallel to pivot 25, to the bottom of the operating boom 15 about midway between its first end 17 and its second end 19. Operation of the hydraulic operator 25, to extend or retract, will move the operating boom 15 up or down about pivot 23.

The support boom 14 includes a boom connector 35. The boom connector 35 extends forwardly from the second or front end 19 of the operating boom 15, aligned with the operating boom and acting as an extension for it. The boom connector 35 has first and second ends 37, 39 and is pivotably mounted at its first or rear end 37 to the second or front end 19 of the operating boom 15 by a horizontal pivot 41 that is parallel to pivot 23. A second hydraulic operator 45 is connected between the operating boom 15 and the boom connector 35, the second operator 45 located beneath them. The second operator 45 is mounted at its rear end by a pivot 49 attached to a flange 51 extending downwardly from the operating boom 15 near its second end 19. The second operator 45 is mounted at its front end by pivot 55 to the bottom of the boom connector 35 well forwardly of the pivot 41. Operation of the second operator 45 will move the boom connector 35 up or down about pivot 41 relative to the operating boom 15, moving its second or front end 39 toward or away from the first or rear end 17 of the operating boom 15. The operating boom 15 and boom connector 35 form a knuckle boom arrangement.

The boom assembly 13 includes a straight delimber boom 59 attached near its front end 61 to the boom connector 35 adjacent its front end 39. The delimber boom 59 is attached with its inner side 65 flush against the outer side 67 of the boom connector 35 in a manner to have the delimber boom 59 extend rearwardly and outwardly from the front end 39 of the boom connector 35 at a slight angle φ to the longitudinal center line 69 of the boom connector 35 when the boom assembly 13 is viewed in plan as shown in FIG. 2. This angle φ is shown at about 10° but can range between 5° and 20°. When the boom assembly 13 holds the delimber boom 59 horizontal, in a generally normal delimbing position, the boom connector 35 is angled slightly upwardly from its connection to the delimber boom 59 to pivot 41 as shown from the side in FIG. 1, and the operating boom 15 is also angled slightly upwardly toward the boom connector 35. The boom assembly 13, in this position, is close to the ground making the delimber/slasher quite stable during delimbing and slashing.

The inner side 65 of the delimber boom 59 can be welded directly to an angled surface 71 on the outer side 67 of the boom connector 35 to permanently connect it to the boom connector as shown in FIGS. 1 and 2. Preferably however, as shown in FIGS. 3 to 6, the delimber boom 59' is detachably connected to the boom connector 35' with cooperating, connecting means 73 on the connector 35' and the boom 59'. The connecting means 73 can have a small platform 74 attached to the inner side 65' of the delimber boom 59' adjacent its front end 61' and extending laterally therefrom. The platform is 74 is at about the center of the inner side 65'. A pair of spaced-apart flanges 75, 75' are mounted on the platform 74 and extend upwardly therefrom. The flanges 75, 75' are spaced apart a distance to snugly receive the outer end portion of the boom connector there between. Each flange 75, 75' has a pair of openings 77, 77' therein, the openings on each side of the two flanges aligned. The outer end portion 78 of the boom connector 35' has a pair of spaced apart holes 79 therein that align with the openings 77, 77' in the flanges 75, 75' when the outer end portion 78 of the boom connector 35' is placed on the platform 74 between the flanges 75, 75'. Bolts 80 are passed through the aligned holes 79 on the flanges and openings 77, 77' on the boom connector to securely connect the boom connector to the delimber boom. The bolts 80 allow the delimber boom 59' to be removed from the boom connector 35' during transport of the machine, thereby reducing its size and making it easier to transport. While one form of detachable connector means 73 has been described, other forms may be used.

The delimber boom 59 has a delimbing head 81, as shown in FIGS. 1 and 2, at its front end 61. The delimbing head 81 has a top support 83 carrying, from front to back, a pair of pick-up and delimbing arms 85, 87 at its front end; a pair of feed rollers 89 behind the arms 85, 87; and a cut-off saw 91 behind the feed rollers 89. The delimbing head 81 is fastened to the bottom 93 of the boom 59 adjacent the front end 61 by the support 83.

When the delimber boom 59 is attached to the boom connector 35, on the outer side 67 thereof, and at an angle thereto, the delimbing head 81 is generally located partly in front of, and at a slight angle, to the boom connector 35 and the operating boom 15. This allows the operator in the cab 11, which cab 11 is located on the inner side of the boom connector 35, to more clearly see the delimbing head 81 and to be able to more easily pick up felled trees with the delimbing arms 85, 87. When referring to the 'inner' and 'outer' sides of the delimber boom and boom connector, the 'inner' side is taken as the side facing the operator's cab which side can be seen by the operator, and the 'outer' side is taken as the side the operator cannot see.

The boom assembly 13 described can operate as is. Felled trees can be easily picked up one at a time at or near their butt ends by the operator with the arms 85, 87 on the delimbing head 81 and placed between the feed rollers 89. Operation of the rollers 89 will feed the tree rearwardly as the arms 85, 87 delimb it. Measuring roller means (not shown), or other suitable known measuring means, can be employed on the delimber boom 59 to measure a length of delimbed tree emerging from the delimbing head 81, and when the desired length is obtained, feeding is stopped, and the cut-off saw 91 is operated to cut the desired log length off the tree. After cut-off, the feed rollers 89 are started again to feed and delimb another length of tree to be cut-off. The boom assembly 13, with the knuckle-boom arrangement between the operator boom 15 and the boom connector 35, and with the delimber boom 59 angled slightly with respect to the boom connector 35, allows the operator to pick up trees extremely close to the vehicle, as well as far away as the boom assembly 13 can reach when extended, thus increasing the efficiency of the machine.

The delimber boom 59 can be provided with a fixed butt plate 95 on its bottom 93 and located adjacent its rear end 97 as shown in FIGS. 1 and 2. The butt plate 95 is fixed to the boom 59 and extends down from the bottom 93 of the boom perpendicular to it to be aligned with the feed rollers 89 on the delimbing head 81. The butt plate 95 is set a distance from the cut-off saw 91 on the delimbing head 81 that allows a standard length log, such as a sixteen foot log, to be cut off the delimbed tree by the saw. The feed rollers 89 feed the delimbed tree until it hits the butt plate 95; feeding is stopped; and the cut-off saw 91 is operated to cut a log of the standard length, determined by the location of the butt plate 95 from the cut-off saw 91, off the tree.

Figure 7:
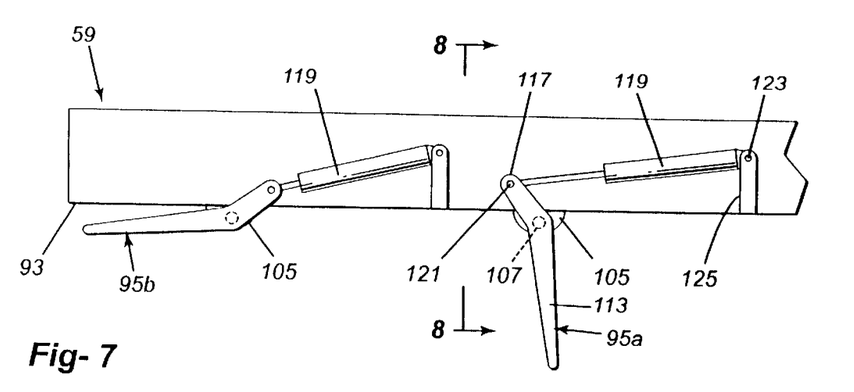
FIG. 7 is a detail side view of the delimber boom with spaced-apart butt plates.
Figure 8:
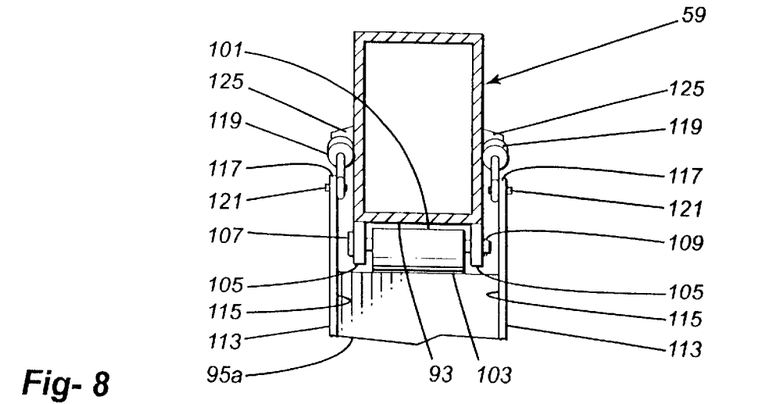
FIG. 8 is a cross-section view taken along line 8—8 in FIG. 7.
Figure 9:
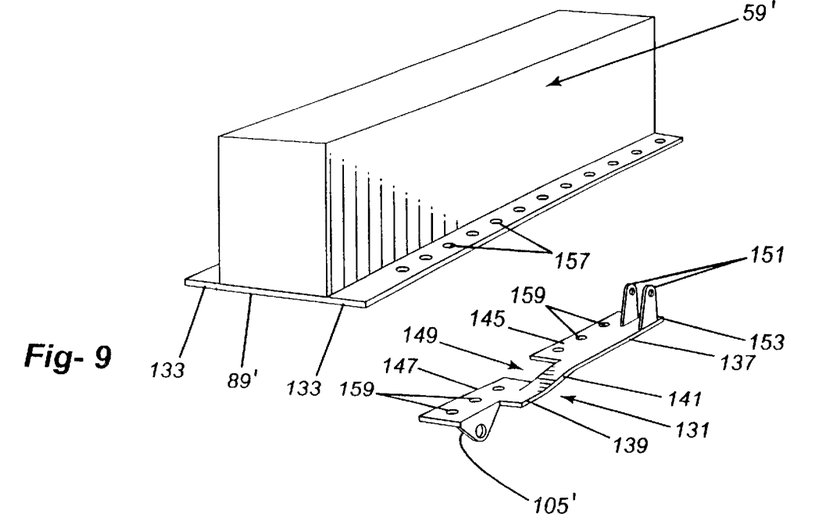
FIG. 9 is a detail, exploded, perspective, view showing a butt plate mounting plate.

Preferably, the boom assembly 13, and more particularly the delimber boom 59, is provided with at least two longitudinally spaced-apart, movable, butt plates 95*a*, 95*b* on its bottom 93 and located toward its rear end 97. The butt plates 95*a*, 95*b*, as shown in FIGS. 7 and 8, are each movable between an operative position, where they extend generally downwardly, transverse to the boom 59, and aligned with the delimbing head 81, and an inoperative position out of the way of alignment with the delimbing head 81 and parallel and adjacent the bottom 93 of the boom 59. The butt plates 95*a*, 95*b*, are used to cut different standard lengths of logs off the trees being delimbed. Using at least two butt plates allows at least two different standard lengths of logs to be cut off the delimbed trees depending on which butt plate is selected to be operative.

The butt plates 95*a*, 95*b* are identical in construction, and similarly mounted on the delimbing boom 59, so only one butt plate 95*a* will be described in detail. Butt plate 95*a* is quadratic in shape with a tubular mounting member 101 fastened along its top edge 103. The mounting member is sized to fit between two mounting brackets 105 fastened to the bottom 93 of the boom 59 adjacent its sides, the brackets 105 extending downwardly. A headed pivot pin 107 passes through openings in the mounting brackets 105 and through the mounting member 101 to rotatably mount the butt plate 95*a* to the bottom of the boom 59. A locking pin 109 extends transversely through the pin 107 to lock the pin 107 in place. The butt plate 95*a* can be strengthened with flanges 113 adjacent its side edges 115. Preferably, the flanges 113 extend upwardly and rearwardly of the mounting member 101 and on either side of it, to provide attachment ears 117 for the butt plate 95*a*. Hydraulic operators 119, one on each side of the delimber boom 59, are pivotably connected at one end to the ears 117 by pivot pins 121 and at the other end by pivot pins 123 to mounting brackets 125 on the sides of the boom. Operation of the operators 119 in one direction will pivot the butt plate 95*a* about its pivot pin 107 to a raised, rearwardly directed, inoperative position where it is adjacent the bottom 93 of the boom 59 and out of the way, as shown by the inoperative position of butt plate 95*b*. Operation of the operators 119 in the other direction will pivot the butt plate 95*a* about its pivot pin 107 to an operative position where it is transverse to the boom and aligned with the feed rolls 89 feeding a delimbed tree rearwardly as shown by the actual position of butt plate 95*a*.

Each butt plate 95*a*, 95*b* is located a predetermined distance from the cutoff saw 91 to provide a log of required length. One butt plate 95*a* can, for example, be located eight feet behind the cut-off saw 91 and the second butt plate 95*b* can be located sixteen feet behind the cutoff saw 91. Depending on whether eight foot or sixteen foot log lengths are required, the appropriate butt plate is placed in operative position during operation of the delimber while the other butt plate is maintained in an inoperative position out of the way. Two butt plates 95*a*, 95*b* have been shown. However, more butt plates can be used. For example, additional butt plates can be placed at twelve and twenty foot distances from the cut off saw 91 if desired.

The butt plates 95*a*, 95*b* have been described as being located at specific distances from the cut-off saw 91, the butt plates rotatable between operative and inoperative positions relative to the boom 59 but fixed against longitudinal movement relative to the boom. However, each butt plate can be adjustably mounted on the boom so its distance from the cutoff saw 91 can be adjusted in small increments, if desired. To this end, and as shown in FIGS. 9 to 12, each butt plate is mounted on a pair of mounting plates 131, one on each side of the delimber boom. The two mounting plates 131 are mounted in the same location on a pair of lateral boom flanges 133 extending laterally from the bottom 89' of the boom 59' past the sides. The two mounting plates 131 each carry a bracket 105' between which the butt plate is rotatably mounted on each side. The mounting plates 131 also each carry a butt plate operator 121'. In more detail, each mounting plate 131 has a front body section 137 and a rear body section 139 joined by a short bridge 141. The bridge 141 lowers the rear body section 139 relative to the front body section 137 although both sections remain parallel. A top, front, flange section 145 extends laterally inwardly from the front body section 137. A bottom, rear, flange section 147 extends laterally inwardly from the rear body section 139. The front and rear flange sections 145, 147 are separated by a gap 149 and the rear flange section 147 is below the front flange section 145 but parallel to it. The front body section 137 has a pair of upstanding brackets 151 at its front end 153 between which the front end of the butt plate hydraulic operator 121' is mounted. The rear flange section 147 carries the bracket 105' through which the mounting pin 107' extends. Each mounting plate 131 is mounted at the same location on its boom flange 133 on boom 59' by having the front flange section 145 adjacent the top of the boom flange 133 and the rear flange section 147 adjacent the bottom of the boom flange 133, the boom flange 133 passing through the gap 149. Bolt holes 157 are provided in both boom flanges 133 spaced the same incremental distance apart. This incremental distance can be two inches for example. Matching bolt holes 159 are provided in both plate flanges 145, 147 on the mounting plates. The bolt holes 159 on the mounting plates 131 are matched with the bolt holes 157 on the boom flanges 133 and bolts 161 are used to fasten the mounting plates 131 to the boom flanges 133 with the butt plate 95*a* supported between the brackets 105'. The operators 121' are attached between the brackets 151 at one end and to the ears 117' on the butt plate 95*a* at the other end to be able to move the butt plate between operative and inoperative positions.

It will be seen that each butt plate is mounted between a pair of mounting plates 131 which plates are adjustably mounted on the boom, the plates also carrying the operator means 121' for the butt plate. If it is desired to adjust the position of a butt plate relative to the cut-off saw, the bolts 161 holding the mounting plates 131, which carry the butt plate, to the boom flanges 133 are removed and the plates 131 are slide along the flanges 133 to a new position where the holes 159 in the plates 131 align with a new set of holes 157 in the flanges 133. The bolts 161 are replaced in the newly aligned holes to lock the butt plate in its new position relative to the cut-off saw.

Each butt plate is mounted in the same manner so that each butt plate can be moved an increment or two toward or away from the cutoff saw if required. The location of each butt plate would depend on the requirements of the mill to which the logs being harvested are sent. Some mills, for example, wish to receive logs that are one or two increments over a standard length, each increment being two inches by way of example. While one manner of mounting the butt plates to be adjustably longitudinally relative to the cut-off saw has been shown, other mounting means for the butt plates can be employed.

Figure 13:
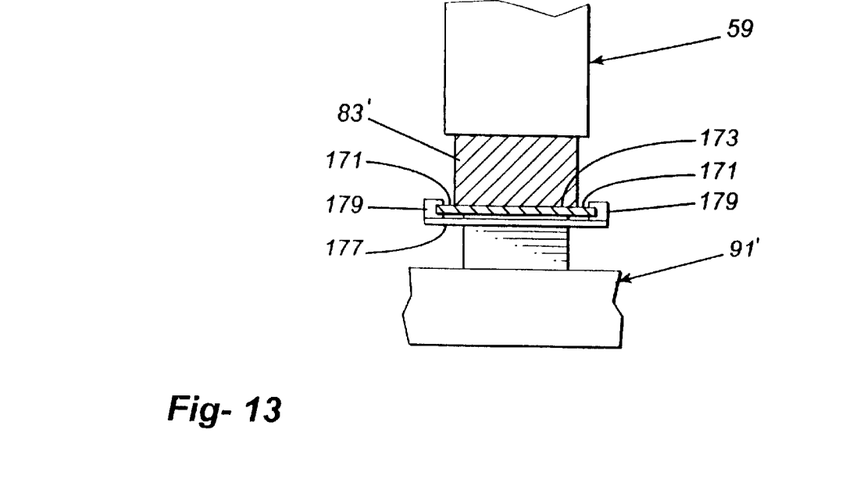
FIG. 13 is a cross-section view of the delimber boom taken adjacent to the cut-off saw.
Figure 14:
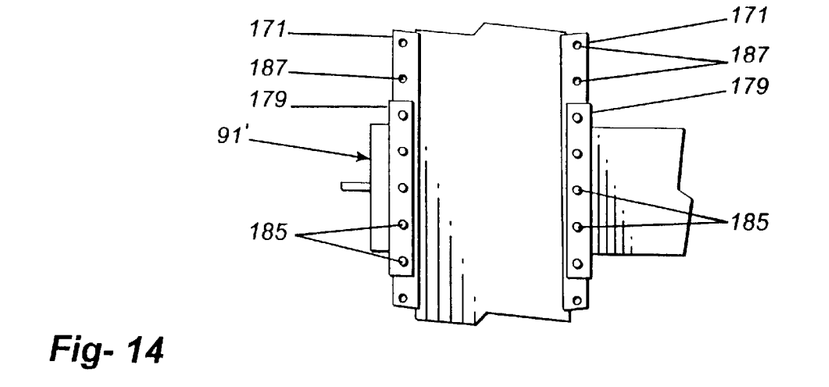
FIG. 14 is a top detail view of the cut-off saw mounting.

The cut-off saw 91 can also be adjustably mounted on the delimber boom 59 if desired, the saw movable in small increments toward or away from the front end of the delimber boom. To this end, as shown in FIGS. 13 and 14, saw support flanges 171 would extend laterally from the bottom 173 of the delimbing head support 83' at least in the area in which the cut-off saw is located. The cut-off saw 91' itself is mounted on a support plate 177, the support plate having support channels 179 on each side. The channels 179 are positioned and sized to slide on the support flanges 171 on the sides of the support 83'. Teflon inserts (not shown) can be provided in the channels 179 to bear on the support flanges 171 to allow the support plate 177 carrying the cutoff saw 91' to easily slide. Matching holes 185, 187 can be provided in the channels 179 and the support flanges 171 respectively through which bolts (not shown) can be inserted to lock the saw 91' in a selected position. Only a few holes 185, 187 are needed, equally spaced apart, to allow limited incremental adjustment of the cut-off saw. The holes can be spaced two inches apart but other spacing can be used.

Figure 15:
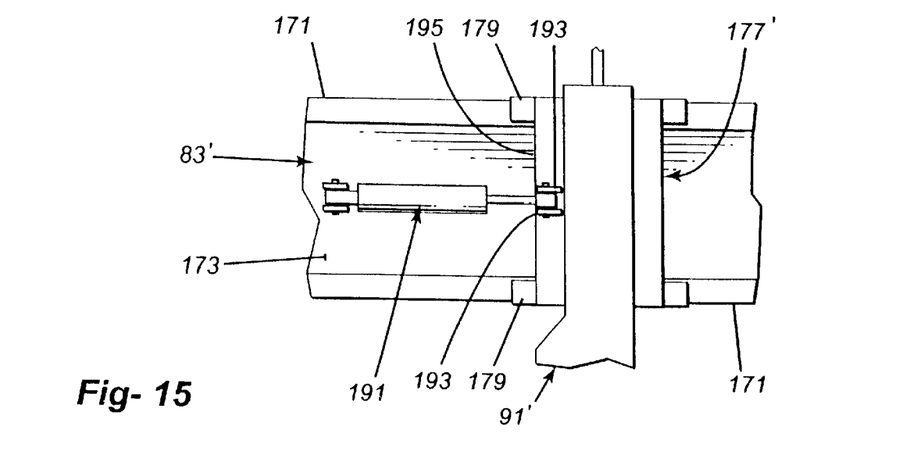
FIG. 15 is bottom detail view of another manner of mounting the cut-off saw for adjustment.

Instead of holes and bolts to adjust the longitudinal position of the cut-off saw, the support plate 177 carrying the saw can be adjusted by a hydraulic operator 191, as shown in FIG. 15, having one end pivotably attached to flanges 193 adjacent to the rear edge 195 of the support plate 177' and the other end pivotably attached to flanges 197 on the bottom 173 of the support 83'. The operator 191 is of the type have three operative positions, these positions being a mid-position, a front position, and a rear position. The operator can be set and locked in any of the three positions to position the saw in the desired location.

Figure 10:
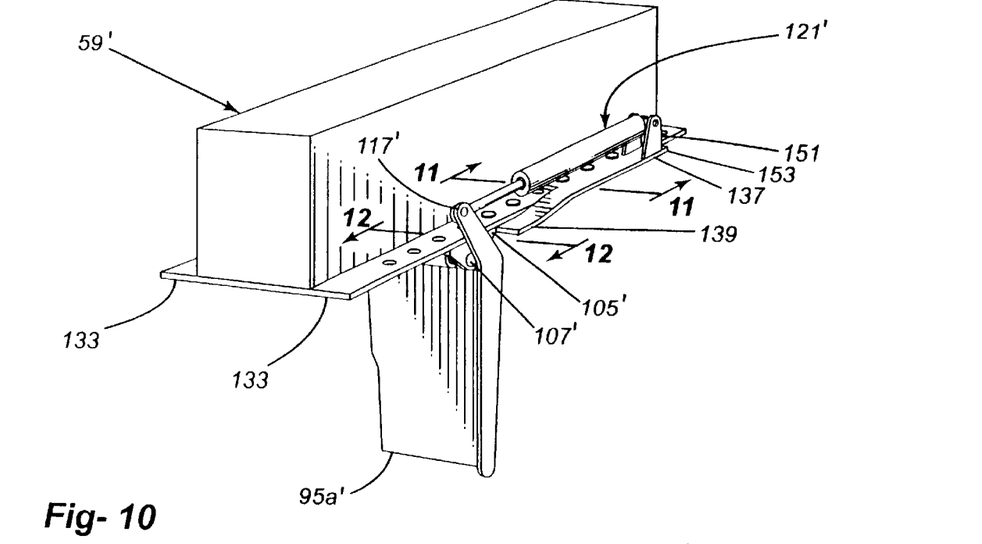
FIG. 10 is a view similar to FIG. 9 showing the mounting plate and butt plate mounted on the boom.
Figure 11:
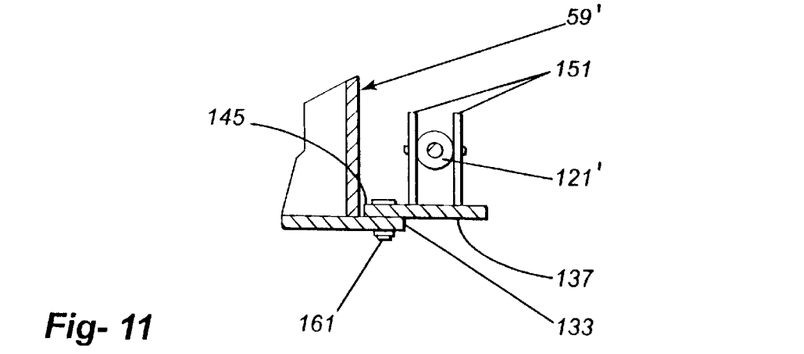
FIG. 11 is a cross-section view taken along line 11—11 in FIG. 10.
Figure 12:
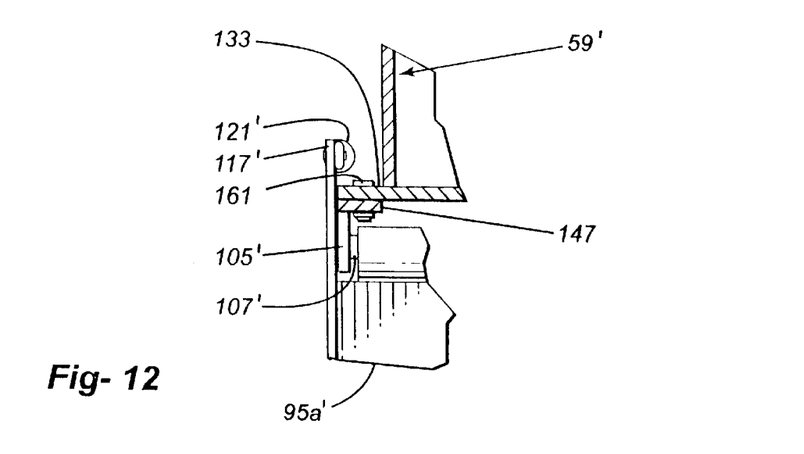
FIG. 12 is a cross-section view taken along line 12—12 in FIG. 10.

The longitudinally adjustable cut-off saw, whether adjusted manually using bolts, or automatically by the delimber operator in the cab using the three position hydraulic operator 191, can be used with a single fixed butt plate, as shown in FIG. 1; with longitudinally fixed, pivotable, butt plates, as shown in FIG. 7; or with longitudinally adjustable, pivotable, butt plates, as shown in FIG. 10.

In operation, using pivotable, longitudinally-adjustable, butt plates, the delimber/slasher is set up to cut delimbed trees to a selected length by longitudinally moving the butt plate associated with the selected length to the desired position, if required. Each butt plate is set up to be operative at a different standard log length. If a mill requires logs to be eight feet, six inches in length, the butt plate at the eight foot location is moved rearwardly from the cut-off saw by loosening its mounting plate assemblies 131, sliding the butt plate back six inches, and then rebolting the mounting plate assemblies in the new position. The newly positioned butt plate is then moved to an operative position from an inoperative position using the hydraulic operators. Instead of moving the butt plate, the cut-off saw can be adjusted incrementally to change its distance from the selected butt plate.

Once the selected butt plate is in the operative position, and the other butt plates are placed in an inoperative position, the delimber operator then delimbs felled trees one at a time by picking up each tree near its butt end, placing the butt end of the tree between the spread apart feed rollers, bringing the rollers together and operating the rollers to feed the tree past the arms to delimb it until it hits the operative butt plate. When the butt plate is hit, the rollers stop feeding and the cut-off saw cuts off a log of the selected length. Feeding, delimbing and cutting off continue until each tree is processed. Having the delimbing boom angled allows the operator to have a clear view of the delimbing head making it easier to pick up the trees for processing. The angled delimber boom also allows the operator to position the delimbing boom parallel to the side of the trail and close to it during delimbing and cut-off without having to swing the boom assembly off the trail thereby possibly damaging growth off the trail. The machine allows piles of delimbed logs to be neatly assembled generally parallel, and adjacent, to the sides of the trail making forwarding of the logs simple and easy and minimizing damage to uncut growth during forwarding.

The delimber/slasher operator can easily change from using one butt plate to using another butt plate. One tree, of one species, may require cutting to one length, while the next tree may be of another species and may require cutting to a different length. Provided the butt plates have been set to the required lengths before processing begins, the operator can easily switch from one butt plate to another when different tree species are encountered during processing.

While the boom delimber with the plurality of butt plates; the adjustable butt plates; and the adjustable saw have been described on a boom delimber that is angularly offset with respect to the connecting boom, this delimber boom, with the above features, can also be used on machines where it is mounted aligned with the connecting boom.

Figure 16A:
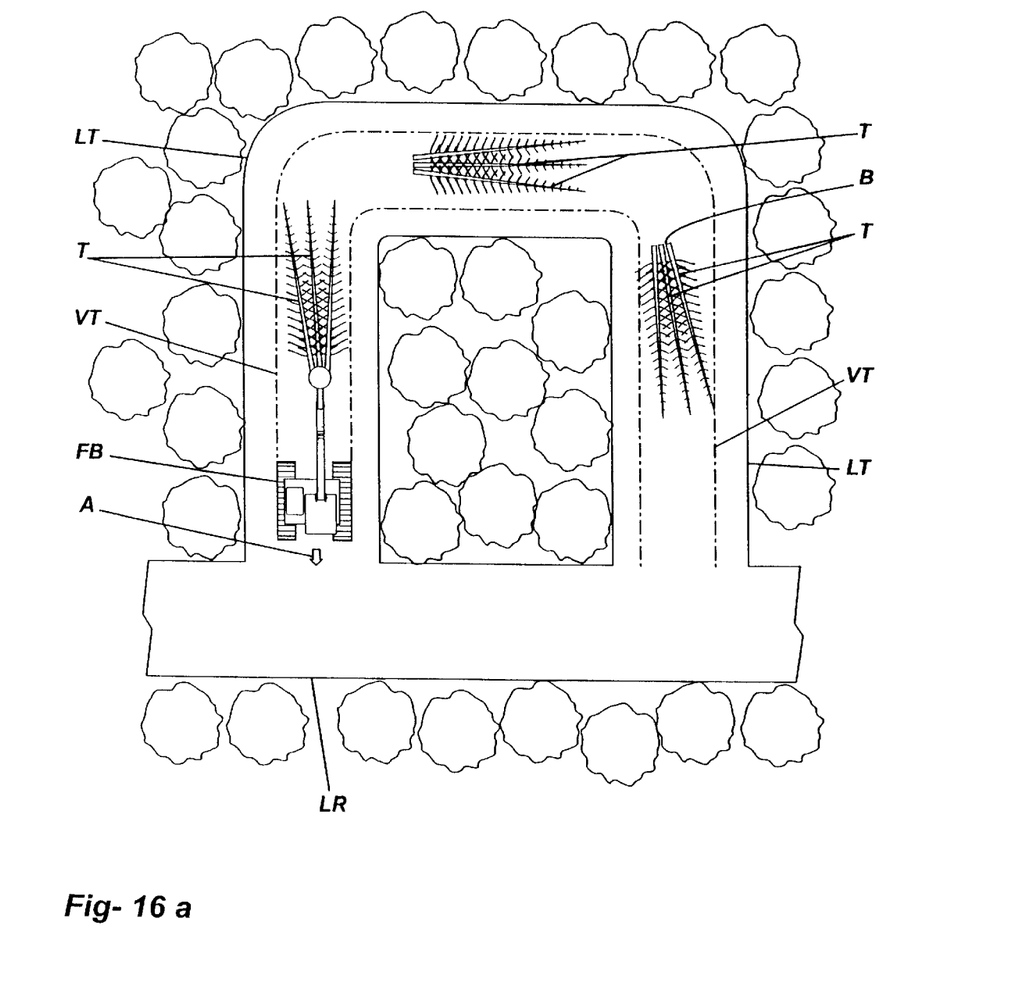
FIGS. 16a and 16b are plan views showing the method of tree harvesting using the delimber/slasher of the present invention.

Preferably, the delimber/slasher described above, having an angularly offset delimbing boom, is used in conjunction with a feller buncher to provide a method of tree harvesting that is environmentally friendly. According to the method, the feller/buncher FB, as shown in FIG. 16a, proceeds off a logging road LR into a stand of timber to be harvested, and moving in a forward direction, fells and bunches trees T in a narrow logging trail LT while forming a central vehicle track VT in the logging trail LT and while returning to the logging road LR as shown by the arrow A. All the trees T felled are bunched in the logging trail TR with their butt ends B facing in the direction of travel of the feller/buncher FB.

Figure 16B:
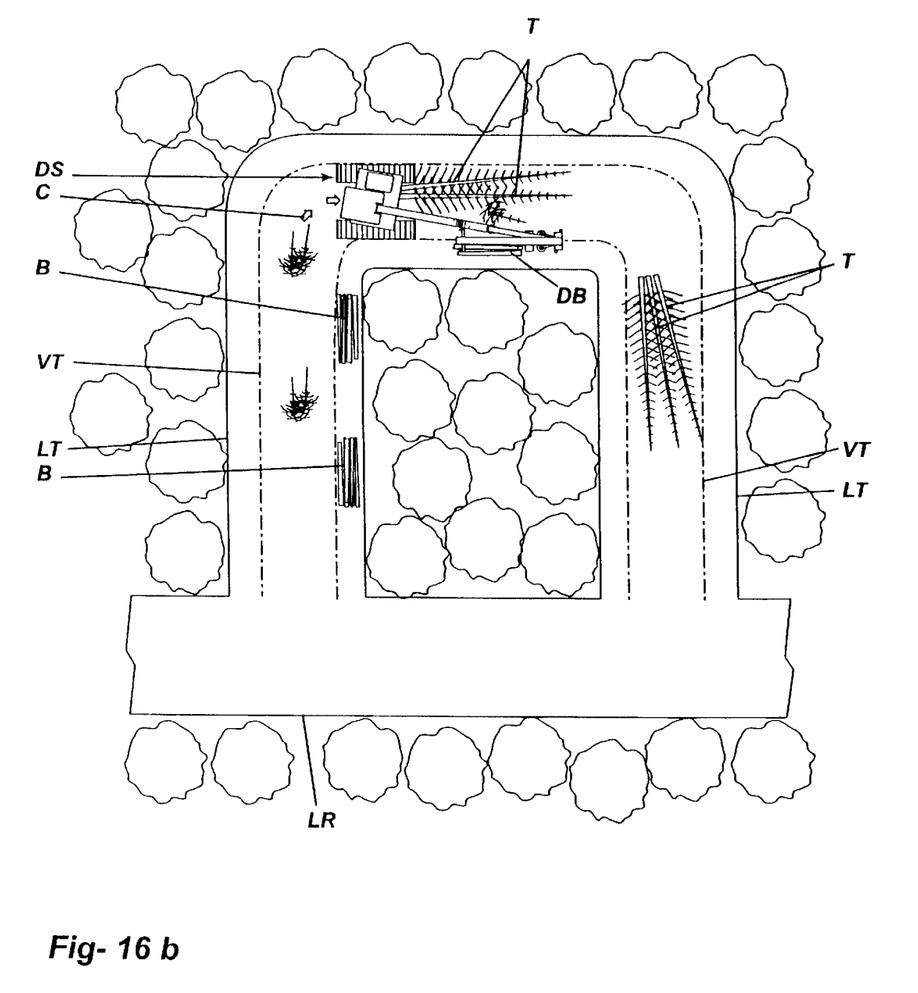

After the trees are felled the delimber/slasher DS, with the angled delimber boom DB travels the logging trail LT in the opposite direction on the central vehicle track VT, as shown in FIG. 16b by the arrow C, delimbing the felled trees T. The delimber/slasher DS picks up each tree by its butt end within the trail, and delimbs it in the middle of the trail until a desired log length has been delimbed. The delimber/slasher DS then positions its boom assembly so that the angled delimber boom DB is generally parallel with the side of the trail and cuts the log length off, the cut-off log length falling down generally parallel to the side of the trail. The machine is used to delimb, cut and form bundles B of logs on the side of the trail, generally parallel to the trail. In this position they can be easily handled and moved by a forwarder. The delimbed branches fall in the center of the trail in the vehicle track VT where they are run over by the vehicle and broken and packed down. Little damage is done to the uncut logging areas adjacent the logging trail LT, and little damage is done to the secondary growth remaining in the logging trail on either side of the vehicle track VT when delimbing thereby satisfying environmental requirements.

We claim:

1. A boom assembly for a delimber having: an operator boom with first and second ends; a connector boom having first and second ends; pivot means pivotably connecting the second end of the operator boom to the first end of the connector boom, the connector boom aligned with the operator boom; a hydraulic operator pivotably connected at its ends between the operator boom and the connector boom in a manner to move the second end of the connector boom toward or away from the first end of the operator boom when operated; a delimber boom having a delimbing head at one end, the delimber boom mounted, near the said one end, to the connecting boom at its second end and extending rearwardly therefrom, the delimber boom mounted to extend at a slight angle, when the boom assembly is viewed from above, to the connector boom.

2. A boom assembly as claimed in claim 1 wherein the angle between the delimber boom and the connector boom ranges between 5° and 20°.

3. A boom assembly as claimed in claim 1 wherein the delimber boom extends rearwardly of the first end of the connector boom.

4. A boom assembly as claimed in claim 2 wherein the delimbing head is mounted on the bottom of the delimber boom; the boom assembly including at least one butt plate mounted on the bottom of the delimber boom, the butt plate located toward the other end of the delimber boom and aligned with the delimbing head.

5. A boom assembly as claimed in claim 2 wherein the delimbing head is mounted on the bottom of the delimber boom; the boom assembly including at least two butt plates, each movably mounted on the bottom of the delimber boom, the butt plates spaced apart longitudinally and spaced from the delimbing head toward the other end of the delimber boom; and operating means associated with each butt plate on the delimber boom for selectively moving the butt plate between an operative position where it is generally transverse to the delimber boom and aligned with the delimbing head to receive the butt end of a tree being delimbed by the delimbing head, and an inoperative position where it is out of the way of the butt end of a tree being delimbed.

6. A boom assembly as claimed in claim 5 including a pivot pin for each butt plate mounted on the delimber boom to extend transverse to the boom adjacent its bottom, the butt plate pivotably mounted along its top edge on the pin for movement between the operative position and the inoperative position where it is parallel to, and adjacent, the bottom of the boom.

7. A boom assembly as claimed in claim 5 including adjustable mounting means for adjustably mounting each butt plate on the delimber boom, the adjustable mounting means permitting each butt plate to be moved incrementally small distances toward or away from the delimbing head.

8. A boom assembly as claimed in claim 6 including adjustable mounting means for adjustably mounting each butt plate on the delimber boom, the adjustable mounting means permitting each butt plate to be moved incrementally small distances toward or away from the delimbing head.

9. A boom assembly as claimed in claim 2 wherein the delimbing head has a cut-off saw and adjustable saw mounting means for mounting the saw on the delimbing head for selective movement in a direction parallel to the delimber boom.

10. A boom assembly as claimed in claim 4 wherein the delimbing head has a cut-off saw and adjustable saw mounting means for mounting the saw on the delimbing head for selective movement in a direction toward or away from the butt plate.

11. A boom assembly as claimed in claim 5 wherein the delimbing head has a cut-off saw and adjustable saw mounting means for mounting the saw on the delimbing head for selective movement in a direction toward or away from the butt plates.

12. A boom assembly as claimed in claim 7 wherein the delimbing head has a cut-off saw and adjustable saw mounting means for mounting the saw on the delimbing head for selective movement in a direction toward or away from the butt plates.

13. A boom assembly as claimed in claim 8 wherein the delimber head has a cut-off saw and adjustable saw mounting means for mounting the saw on the delimber head for selective movement in a direction toward or away from the butt plates.

14. A delimber boom having a delimbing head at one end; the delimbing head mounted on the bottom of the delimber boom and having a cut-off saw; at least two butt plates mounted on the bottom of the delimber boom, toward the other end of the boom, the butt plates spaced apart in the longitudinal direction of the boom; each butt plate located a standard log length distance from the cut-off saw; and operating means for each butt plate for selectively moving each butt plate between an operative position transverse to the boom and extending down from the boom to be aligned with a delimbed tree emerging rearwardly from the delimbing head to receive the butt end of the tree and an inoperative position where it is out of the way of the tree being delimbed.

15. A delimber boom as claimed in claim 14 including a pivot pin for each butt plate mounted on the delimber boom to extend transverse to the boom adjacent its bottom, the butt plate pivotably mounted along its top edge on the pin for movement between the operative position and the inoperative position where it is parallel to, and adjacent, the bottom of the boom.

16. A delimber boom as claimed in claim 14 including adjustable mounting means for adjustably mounting each butt plate on the delimber boom, the adjustable mounting means permitting each butt plate to be moved incrementally small distances toward or away from the delimbing head to change the standard log length distance.

17. A delimber boom as claimed in claim 15 including adjustable mounting means for adjustably mounting each butt plate on the delimber boom, the adjustable mounting means permitting each butt plate to be moved incrementally small distances toward or away from the delimbing head to change the standard log length distance.

18. A delimber boom as claimed in claim 14 wherein the delimbing head has a cut-off saw; and adjustable saw mounting means for mounting the saw on the delimbing head for selective movement in a direction toward or away from the butt plates to change the standard log length distance.

19. A delimber boom as claimed in claim 16 wherein the delimbing head has a cut-off saw; and adjustable saw mounting means for mounting the saw on the delimbing head for selective movement in a direction toward or away from the butt plates to change the standard log length distance.

20. A delimber boom as claimed in claim 16 wherein the mounting means for each butt plate includes a mounting plate on each side of the butt plate assembly, the mounting plate having a raised forward flange separated by a gap from a lowered rear flange, the boom having boom flanges on each side adjacent the bottom, each butt plate assembly having the mounting flanges mounted on the boom flanges with the forward flange on top of the boom flange and adjacent to it and the rear flange on the bottom of the boom flange and adjacent to it.

21. A delimber boom as claimed in claim 20 including a first set of holes incrementally spaced on the boom flanges and a second set of holes incrementally spaced apart the same distance as the first set of holes are spaced apart on the mounting flanges, the holes aligned to allow bolts to pass through the holes to secure the butt plate assembly in the desired selected position relative to the boom.

22. A delimber/slasher having a vehicle; a support rotatable on the vehicle about a vertical axis; a boom assembly having an operator boom; one end of the operator boom connected to the support; a connector boom pivotably connected at one end to the other end of the operator boom; a hydraulic cylinder pivotably connected at its ends between the operator boom and the connector boom in a manner to pivot the other end of the connector boom toward the other end of the operator boom when operated; a delimber boom having a delimbing head at one end, the delimber boom fixedly mounted at the one end to the connector boom at its other end to extend rearwardly from the other end of the connector boom, the delimber boom mounted to extend at a slight angle to the connector boom to one side of the operator boom; and an operator's cab on the support on the other side of the operator boom.

23. A delimber/slasher as claimed in claim 22 including a butt plate fixed on the bottom of the delimber boom spaced from the delimbing head.

24. A delimber/slasher as claimed in claim 22 including a pair of butt plates on the bottom of the delimber boom, the butt plates spaced from each other and from the delimbing head; and means for moving each butt plate between a raised, inoperative position and a lowered, operative position.

25. A delimber/slasher as claimed in claim 24 including mounting means for adjustable mounting each butt plate for longitudinal movement on the delimber boom.

26. A delimber boom to be used on a delimber/slasher, the delimber boom having a delimbing head at one end and at least one butt plate at the opposite end; the delimbing head carrying delimbing means, feed means and a cut-off saw; and mounting means for the cut-off saw for adjustably mounting it on the delimbing head to vary its distance from the butt plate.

27. A delimber boom as claimed in claim 26 wherein the mounting means includes a support plate carrying the saw; guide means on the boom for guiding the support plate for movement toward or away from the butt plate; and an operator connected between the boom and the support plate for moving the support plate on the guide means.

28. A delimber boom as claimed in claim 27 wherein the operator can place the plate in one of three selected positions on the guide means relative to the butt plate.

29. A method for use in harvesting felled trees from a logging trail with a delimber/slasher having a support boom and a delimber boom angled from the support boom; the method comprising delimbing at least a portion of each tree with the delimber/slasher on the logging trail; moving the support boom so that the angled delimber boom, carrying each delimbed tree, is generally parallel to the side of the logging trail and cutting a log length of tree off the delimbed portion of the tree so that the log falls onto the trail to be generally parallel to the side of the trail.

30. A method as claimed in claim 29 wherein the angled delimber boom is positioned adjacent the side of the trail before cutting the log length.

31. A method of harvesting trees in an environmentally friendly manner comprising: moving a feller/buncher off a logging road at an entry point into a forest area; passing the feller/buncher through the forest area to return to the logging road at a return point spaced from its entry point, the feller/buncher forming a logging trail between the entry point and the return point while passing through the forest area; the feller/buncher felling trees on the trail and bunching them on the trail with the butt ends of the trees facing in the direction of travel of the feller/buncher: moving a delimber/slasher, of the type having a support boom and a delimber boom angled from the support boom, in the opposite direction on the trail from the return point to the entry point to delimb on the trail and cut into log length on the trail, the felled, bunched trees, and to pile the cut tree lengths into piles on the trail, the piles generally parallel to the sides of the trail.

32. A method as claimed in claim 31 wherein the trees are piled into piles adjacent the sides of the trail.

* * * * *